United States Patent
Betton et al.

(10) Patent No.: US 12,333,358 B2
(45) Date of Patent: Jun. 17, 2025

(54) SHRINK FILM COLOUR ADJUSTMENT

(71) Applicant: DOMINO UK LIMITED, Cambridge (GB)

(72) Inventors: Eleanor Susanne Betton, Cambridge (GB); Jaime Calero López, Cambridge (GB); Neil James Harrop, Cambridge (GB)

(73) Assignee: Domino UK Limited (GB)

( * ) Notice: Subject to any disclaimer, the term of this patent is extended or adjusted under 35 U.S.C. 154(b) by 0 days.

(21) Appl. No.: 18/280,392

(22) PCT Filed: Mar. 7, 2022

(86) PCT No.: PCT/EP2022/055759
§ 371 (c)(1),
(2) Date: Sep. 5, 2023

(87) PCT Pub. No.: WO2022/184941
PCT Pub. Date: Sep. 9, 2022

(65) Prior Publication Data
US 2024/0078401 A1    Mar. 7, 2024

(30) Foreign Application Priority Data
Mar. 5, 2021 (GB) ..................... 2103127

(51) Int. Cl.
*G06K 15/02* (2006.01)
*B41J 2/21* (2006.01)
*B41M 5/00* (2006.01)

(52) U.S. Cl.
CPC ............ *G06K 15/1843* (2013.01); *B41J 2/21* (2013.01); *B41M 5/0047* (2013.01); *B41M 5/0064* (2013.01); *G06K 15/021* (2013.01); *G06K 15/1848* (2013.01); *G06K 15/1868* (2013.01); *G06K 2215/0094* (2013.01); *G06K 2215/101* (2013.01)

(58) Field of Classification Search
None
See application file for complete search history.

(56) References Cited

U.S. PATENT DOCUMENTS

| | | | | |
|---|---|---|---|---|
| 2011/0265953 | A1* | 11/2011 | Kroell | B44C 1/1758 156/378 |
| 2014/0327968 | A1* | 11/2014 | Krause | G02B 3/0037 359/619 |

* cited by examiner

*Primary Examiner* — Darryl V Dottin
(74) *Attorney, Agent, or Firm* — Bochner PLLC; Andrew D Bochner

(57) ABSTRACT

A method of controlling an inkjet printer when printing on a substrate that is to be shrink wrapped on to an object (10), by loading an image file on to a raster image processor; undertaking raster image processing on the loaded image file to generate raster image data for controlling discharge of ink droplets on to the substrate; receiving an indication of a shape (19) of the object (10); and manipulating the generated raster image data in response to the indication of the shape (19) of the object (10) to alter the distribution and/or size of droplets applied to the substrate to take into account anticipated changes (14) in a dimension (11, 12, 13) of the substrate due to shrinkage into contact with the object (10). Also a printer for carrying out the method.

19 Claims, 2 Drawing Sheets

SHRINK FILM COLOUR ADJUSTMENT

FIELD OF THE INVENTION

This invention relates to a method of controlling the operation of an inkjet printer, to a method of printing ink droplets on to a substrate in advance of the substrate being shrunk against a surface of an object, and to a printer configured to perform such methods.

BACKGROUND TO THE INVENTION

It is commonplace to print onto substrates that are subsequently shrunk onto three-dimensional objects. One example of such a substrate is a label sleeve that is subsequently shrunk on to the surface of a bottle. Such substrates typically include artwork and, even more typically, multi-coloured artwork. This artwork is conveniently applied by a multi-colour digital inkjet printer. In such printers the finished artwork is separated into image files of each of the primary colours to be printed, and each image file is then subjected to raster image processing (RIP), as a result of which the distributions (and, possibly, sizes) of the ink droplets that form the desired artwork are defined.

When shrinking a substrate, printed using an inkjet process, onto an object, problems can arise. In areas of significant shrinkage, typically areas of significant reduction in a dimension of an object to which the substrate is applied, the densities of ink droplets in those areas are increased and the increased densities can hinder shrinking and/or cause cracking of the ink layer or substrate.

Printer control software packages are known that provide image adjustment for shrink wrapping applications, however these rely on adjusting the shape or form of the artwork to compensate for changes in the shape of the object to which the substrate is to be applied. The adjustment is applied to each colour separation derived from the original artwork and is made before RIP, meaning that the image data will further alter once subjected to RIP. We have found that RIP typically adds density back into the image which can result in poor image quality or even the hindered shrinking and/or cracking already mentioned.

It is an object of this invention to go at least some way in addressing the aforementioned problem; or at least provide a novel and useful alternative.

SUMMARY OF THE INVENTION

In a first aspect the invention provides a method of controlling the operation of an inkjet printer when printing on to a substrate that is to be shrink wrapped on to an object, the method comprising the steps of: loading an image file on to a raster image processor; undertaking raster image processing on the loaded image file to generate raster image data for controlling discharge of ink droplets on to the substrate; receiving an indication of a shape of the object; and manipulating the generated raster image data in response to the indication of the shape of the object to alter the distribution and/or size of droplets applied to the substrate to take into account anticipated changes in a dimension of the substrate due to shrinkage into contact with the object.

Where the raster image processor forms part of the printer, the step of loading an image file on to a raster image processor is carried out by loading an image file on to the printer.

Where the raster image processor is separate from the printer, the method includes the step of communicating the generated raster image data or manipulated generated raster image data from the raster image processor to the printer.

Preferably manipulating the generated raster image data in response to the indication of the shape of the object comprises manipulating the generated raster image data to reduce a density of the distribution of droplets applied to at least a portion of the substrate to take into account a reduction in a dimension of the object.

Manipulating the generated raster image data in response to the indication of the shape of the object may advantageously comprise manipulating the generated image data to reduce an average size of droplets applied to at least a portion of the substrate to take into account a reduction in a dimension of the object.

Preferably manipulating the generated raster image data to reduce the density of the distribution of droplets and/or to reduce the average size of the droplets includes referring to a look-up table in which reductions in density of distribution of droplets and/or reductions of average size of droplets are linked to reductions in the dimension of the object.

Alternatively manipulating the generated raster image data to reduce the density of the distribution of droplets and/or to reduce the average size of the droplets is effected using an algorithm linking reductions in density of distribution of droplets and/or reductions of average size of droplets to reductions in the dimension of the object.

Preferably the method is applied to a multi-colour inkjet printer, wherein the method is applied to a plurality of image files, each image file corresponding to one of the ink colours of the printer.

In a second aspect the invention provides a method of printing ink droplets on to a substrate according to image data that prescribe distributions and/or sizes of ink droplets to be printed on the substrate, in advance of the substrate being shrunk against a surface of an object, the method including the steps of: capturing data representative of a shape of the surface; defining a relationship between changes in shape of the surface and changes in the distributions and/or sizes of ink droplets to be applied to the substrate; based on the relationship defined, changing the distributions and/or sizes of ink droplets by changing the image data; and printing the ink droplets with the changed distributions and/or sizes.

Preferably the method comprises undertaking raster image processing (RIP) of an image file to generate the image data, the step of changing the image data following RIP.

Preferably the relationship between changes in shape of the surface and changes in the distributions and/or sizes of ink droplets is stored in a look-up table or is determined according to an algorithm.

Preferably changes in shape of the surface are captured as % reductions in a maximum dimension of the object and changes in distributions and/or sizes of ink droplets are defined as % reductions in the densities of distributions and/or average sizes of ink droplets prescribed in the image data.

Preferably the method comprises printing a plurality of colour separations, the step of changing the distributions and/or sizes of the ink droplets being different for at least two of the plurality of colour separations.

In a third aspect the invention provides a printer configured to perform the method of the first or second aspect of the invention.

Preferably the printer is a multi-colour digital printer.

BRIEF DESCRIPTION OF THE DRAWINGS

The invention will now be described, by way of example, with reference to the attached drawing figures, in which.

DETAILED DESCRIPTION OF AN EMBODIMENT

In broad terms the invention provides a method of reducing the density of distribution and/or average size of ink droplets on at least parts of a substrate to be subsequently shrink wrapped onto a three-dimensional object. In the following detailed description the reduction in density of droplet distribution and/or average droplet size is referred to as "gradation" and the particular example described herein relates to printing onto a substrate to be shrink wrapped onto a bottle. However, those skilled in the art will recognise that the nature of the end product is not critical, and the substrate may have printing applied to make it appropriate for shrink wrapping on to any three-dimensional object.

As a first step, the shape of the bottle is defined. The gradations appropriate for that shape are then determined and applied to selected colour image files that have already been subjected to raster image processing. The modified image files are then printed.

Figure 1:
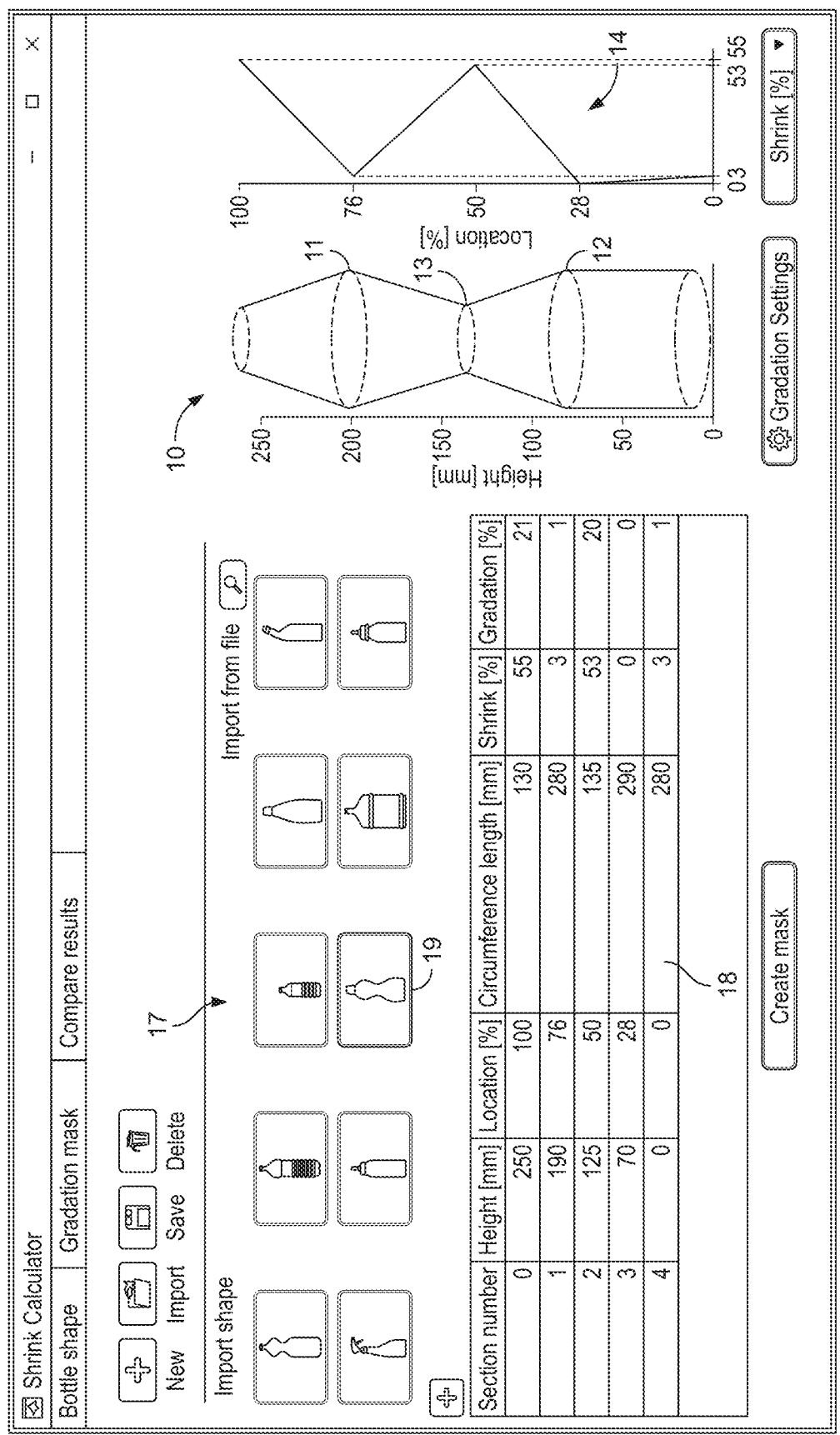
FIG. 1 is a snapshot from a user interface of a printer according to the third aspect of the invention in which object shapes may be selected or specified.

Referring to FIG. 1, a generic shape of a bottle 10 to be shrink wrapped is shown, the bottle 10 having local maximum circumferences 11 and 12, and a minimum circumference 13. The variations in circumference over the height of the bottle 10 are shown in graph 14.

It is convenient to express dimensions (in this case circumferences) of the bottle 10 as percentages of the greatest dimension, giving a percentage shrink to be applied to the printed substrate (in this case a cylindrical sleeve).

As shown in FIG. 1 multiple measurements of circumference may be taken to provide an approximate outline shape. A user may add in as many sections as desired and data applicable to particular objects (in this case bottles) may be stored in a library 17 as shown to the left in FIG. 1. The table 18 in FIG. 1 contains gradation data for the bottle shape 19 stored in the library.

Having specified or selected the bottle shape, the relationship between the reduction in circumference and the gradation is developed, each conveniently expressed in percentage terms. In the initial instance, and in the absence of library data, the gradation may be established empirically by the user until the desired colour balance is achieved with the substrate in the shrunk state. Data initially developed empirically may be further developed into an algorithm and/or used to form the basis of a look-up table.

In practice, gradation is effected by reducing the density of the distribution of ink droplets on the substrate.

Some inkjet print heads are capable of controllably discharging ink droplets of different sizes. Where such print heads are used, the invention may be implemented by reducing the density of the distribution of ink droplets on the substrate by causing the print heads to discharge fewer ink droplets, and/or reducing the average size of the ink droplets by causing the print heads to discharge at least some smaller ink droplets.

Figure 2:
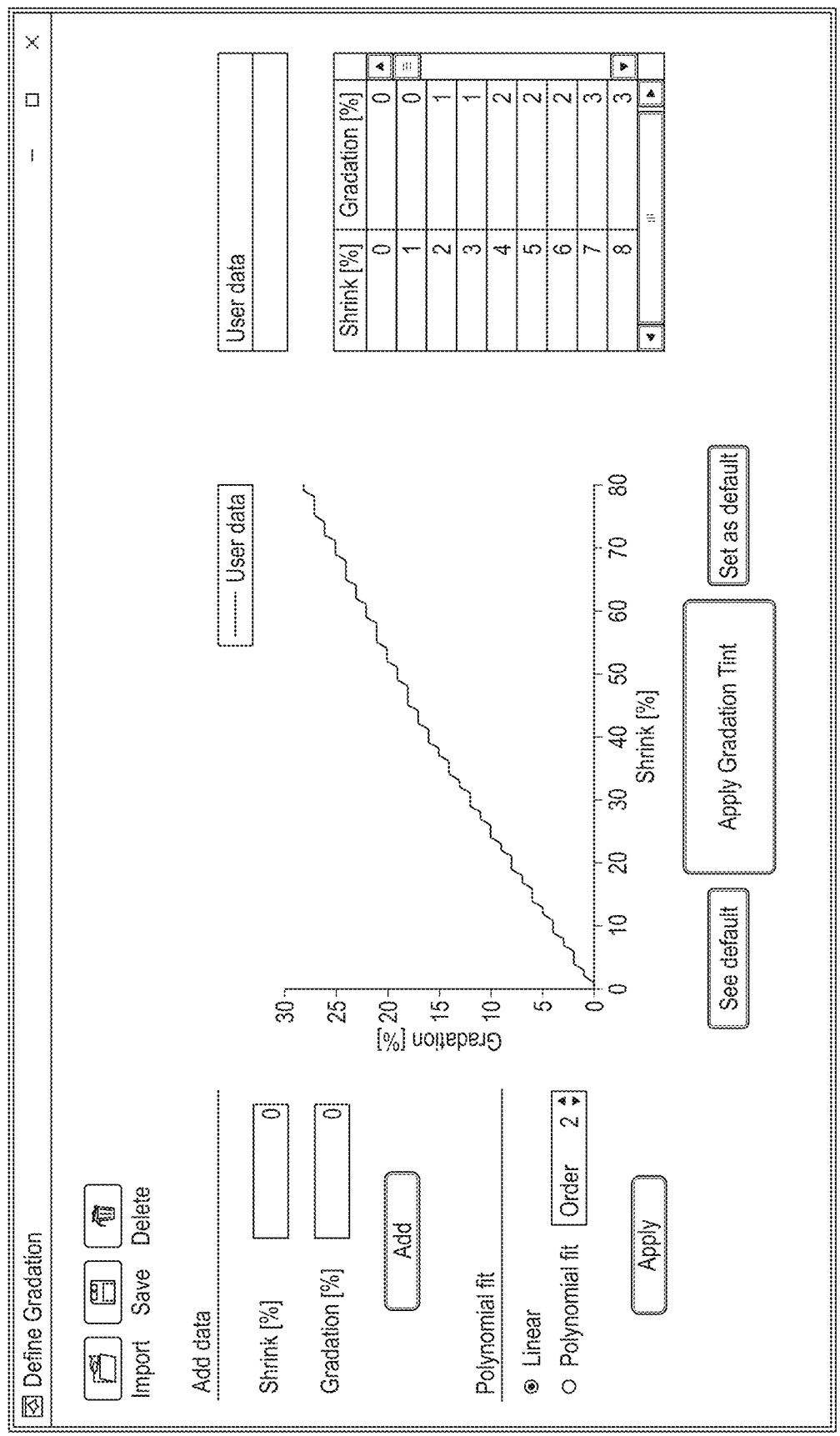
FIG. 2 is a further snapshot from the user interface indicating how density of droplet distribution is determined relative to reduction in object dimension.

In FIG. 2 a relatively linear relationship between shrinkage and gradation is shown. However, the invention is not limited to such relationships.

Whatever the source of the gradation data, gradation values may be adjusted manually.

In many instances, printing of the substrates is undertaken using a multi-colour digital printing press and thus the method above described is applied to selected, if not all, colour separations, given the colour spread across the areas of significant shrinkage.

Having established a shrinkage/gradation relationship, by whatever means, that is appropriate for a particular object, a mask is created for each colour separation image file generated by the RIP. Each mask is, in effect, a monochrome image of the same dimensions as a colour separation image and banded either horizontally or vertically, depending on the orientation in which the substrate is to be applied to the object, the bands corresponding to regions of different amounts of shrinkage or the substrate. The pixel values of the bands are calculated as the amounts that must be subtracted from the pixel values of the corresponding colour separation image file to obtain the percentage gradations corresponding to the percentage shrinkages of the substrate.

A mask can thus be visualised as a banded monochrome image with white bands corresponding to regions of the substrate that are to undergo little or no shrinkage, and darker bands corresponding to regions of the substrate that are to undergo more shrinkage.

The manipulated colour separation image files that are printed by the printer are obtained by subtracting the pixel values of the corresponding mask from the pixel values of each of the colour separation image files generated by the RIP.

An advantage of this approach is that it allows easy visual comparison on screen by the user of the manipulated colour separation image files and the colour separation image files generated by the RIP, because the manipulated colour separation image files can be generated very quickly from the colour separation image files generated by the RIP.

The method as above described is undertaken using a multi-colour digital printing press with a user interface to allow a user to establish the gradation of artwork to be printed.

A significant benefit of the invention is that gradation is applied following RIP and thus a user can readily establish the desired gradation without the complication of altering the original artwork.

It will be appreciated that the above description relates only to one embodiment of the invention, and that the invention encompasses other embodiments as defined by the claims.

The invention claimed is:

1. A method of controlling the operation of an inkjet printer when printing on to a substrate that is to be shrink wrapped on to an object, the method comprising the steps of:
    loading an image file on to a raster image processor;
    undertaking raster image processing on the loaded image file to generate raster image data for controlling discharge of ink droplets on to the substrate;
    receiving an indication of a shape of the object; and
    manipulating the generated raster image data in response to the indication of the shape of the object to alter the distribution or size of droplets applied to the substrate to take into account anticipated changes in a dimension of the substrate due to shrinkage into contact with the object.

2. A method as claimed in claim 1, wherein manipulating the generated raster image data in response to the indication of the shape of the object comprises manipulating the generated raster image data to reduce a density of the distribution of ink droplets applied to at least a portion of the substrate to take into account a reduction in a dimension of the object.

3. A method as claimed in claim 1, wherein manipulating the generated raster image data in response to the indication of the shape of the object comprises manipulating the generated raster image data to reduce an average size of droplets applied to at least a portion of the substrate to take into account a reduction in a dimension of the object.

4. A method as claimed in claim 2, wherein manipulating the generated raster image data to reduce the density of the distribution of ink droplets includes referring to a look-up table in which reductions in density of distribution of droplets are linked to reductions in the dimension of the object.

5. A method as claimed in claim 2, wherein manipulating the generated raster image data to reduce the density of the distribution of droplets is effected using an algorithm linking reductions in density of distribution of droplets to reductions in the dimension of the object.

6. A method as claimed in claim 1 when applied to a multi-colour inkjet printer, wherein the method is applied to a plurality of image files, each image file corresponding to one of the ink colours of the printer.

7. A method of printing ink droplets on to a substrate according to image data that prescribe distributions or sizes of ink droplets to be printed on the substrate, in advance of the substrate being shrunk against a surface of an object, the method including the steps of:
   capturing data representative of a shape of the surface;
   defining a relationship between changes in shape of the surface and changes in the distributions or sizes of ink droplets to be applied to the substrate;
   based on the relationship defined, changing the distributions or sizes of ink droplets by changing the image data; and
   printing the ink droplets with the changed distributions or sizes.

8. A method as claimed in claim 7 comprising undertaking raster image processing (RIP) of an image file to generate the image data, the step of changing the image data following RIP.

9. A method as claimed in claim 7, wherein the relationship between changes in shape of the surface and changes in the distributions and/or sizes of ink droplets is stored in a look-up table or is determined according to an algorithm.

10. A method as claimed in claim 9, wherein changes in shape of the surface are captured as percent reductions in a maximum dimension of the object and changes in distributions or sizes of ink droplets are defined as percent reductions in the densities of distributions or average sizes of ink droplets prescribed in the image data.

11. A method as claimed in claim 7, comprising printing a plurality of colour separations, the step of changing the distributions or sizes of the ink droplets being different for at least two of the plurality of colour separations.

12. A printer configured to perform the method of claim 1.

13. A multi-colour digital printer as claimed in claim 12.

14. A method as claimed in claim 3, wherein manipulating the generated raster image data to reduce the average size of the droplets includes referring to a look-up table in which reductions of average size of droplets are linked to reductions in the dimension of the object.

15. A method as claimed in claim 3, wherein manipulating the generated raster image data to reduce the average size of the droplets is effected using an algorithm linking reductions of average size of droplets to reductions in the dimension of the object.

16. A printer configured to perform the method of claim 7.

17. A multi-colour digital printer as claimed in claim 16.

18. A method as claimed in claim 8, wherein manipulating the generated image data to reduce the size of the droplets includes referring to a look-up table in which reductions of average size of droplets are linked to reductions in the dimension of the object.

19. A method as claimed in claim 8, wherein manipulating the generated image data to reduce the size of the droplets is effected using an algorithm linking reductions of size of droplets to reductions in the dimension of the object.

* * * * *